Patented June 25, 1935

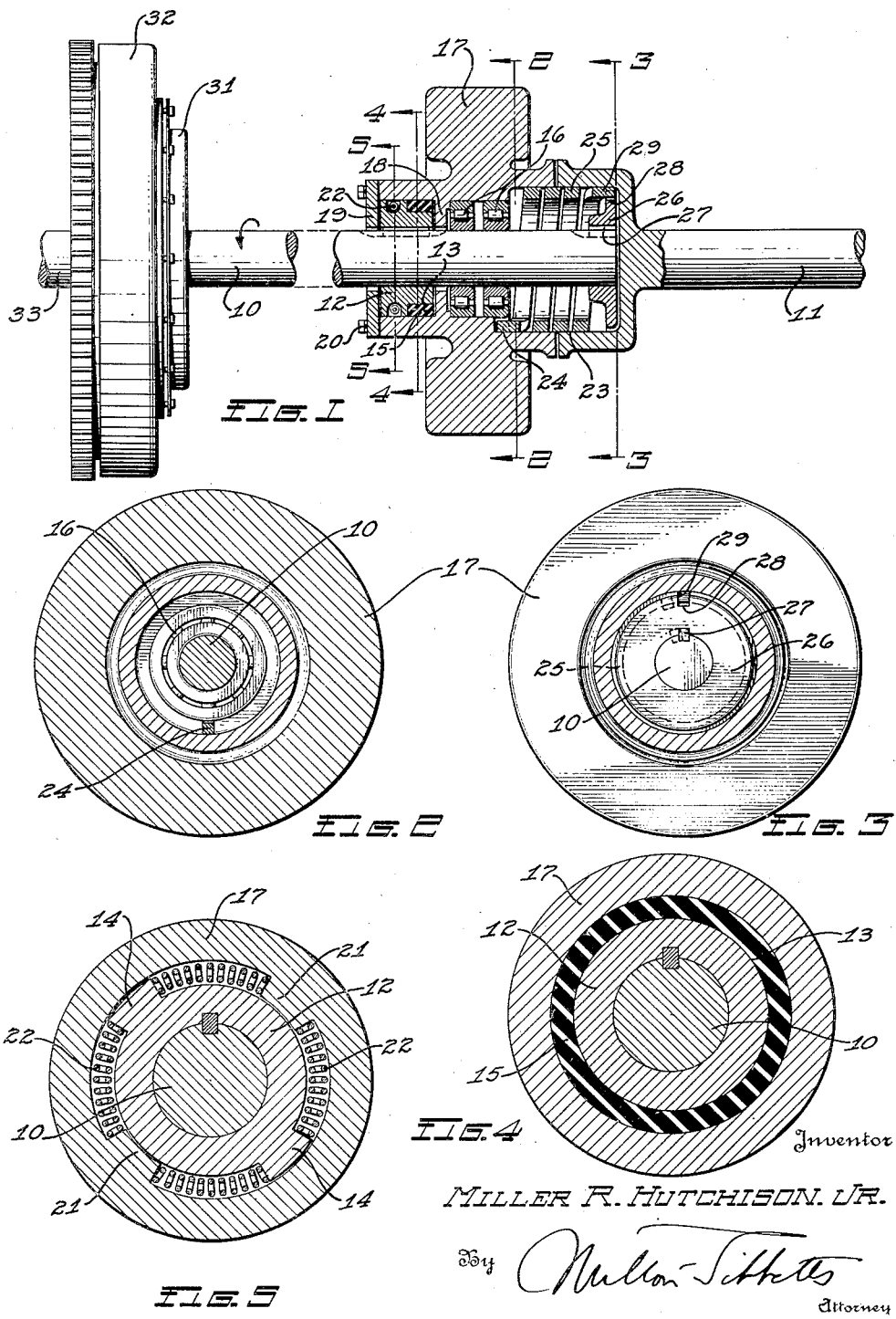

2,005,974

UNITED STATES PATENT OFFICE 2,005,974

POWER TRANSMISSION SYSTEM

Miller R. Hutchison, Jr., New York, N. Y., assignor to Packard Motor Car Company, Detroit, Mich., a corporation of Michigan Application October 24, 1931, Serial No. 570,857

13 Claims. (Cl. 74—64)

This invention relates to power transmission systems and more particularly to such systems as may be used on motor vehicles.

It is one of the objects of my invention to provide a mechanical power transmission system capable of transferring torque from a driving to a driven member at various torque ratios without the use of gears or other commonly used devices for multiplying the torque.

There are several types of torque amplifying mechanisms and for each of these there are several types of control mechanisms for choosing the torque ratio to be used. It is one of the objects of the present invention to incorporate in a torque amplifying mechanism automatic means for changing from one torque ratio to another whenever the difference between the torque supplied by the driving member and the torque required by the driven member reaches a predetermined value. If this difference is increasing the torque ratio will be decreased and vice versa.

A still further object of my invention is to combine in a unitary structure the two functions of providing various torque ratios and controlling the choice of ratio.

My invention is applicable to many types of service and a still further object thereof is to apply the construction I have developed to a motor vehicle thus enabling one to dispense with gear boxes and their attendant disadvantages.

Still another object of the invention is to provide torque amplifying and torque ratio controlling and selecting mechanism having elements of simple construction, assembled within a minimum space and capable of functioning for long periods of time without attention or wear.

Other objects of the invention will appear from the following description taken in connection with the drawing which forms a part of this specification and in which Fig. 1 is a view partly in elevation and partly in longitudinal section, showing a motor vehicle transmission embodying this invention;

Fig. 2 is a section taken substantially on the line 2—2 of Fig. 1;

Fig. 3 is a section taken substantially on the line 3—3 of Fig. 1;

Fig. 4 is an enlarged section taken substantially on the line 4—4 of Fig. 1, and Fig. 5 is an enlarged section taken substantially on the line 5—5 of Fig. 1.

Referring to the drawing, 10 represents a driving member which may, for example, be the clutch shaft in a motor vehicle, and 11 represents the driven shaft, which in a motor vehicle would correspond to the propeller shaft. Between the driving and the driven members is located the torque amplifying means and the control mechanism which form the subject matter of this invention.

The construction consists essentially of a driving member, an energy reservoir, a driven member, connections between the two members and the energy reservoir and between the two members around the energy reservoir, and mechanism for breaking the connections to the driven member when the energy stored in the reservoir amounts to a predetermined figure.

In the drawing I have shown the energy reservoir as being composed of a suitably resilient material which may be rubber, a rubber composition, or springs. The springs may be of any shape and arranged to function in series or in parallel with other springs or with a resilient material, 15. Any form may be used, the most advantageous one being that in which is present the least possible internal friction or energy hysteresis loss. In the drawing I have shown the driving member 10 as having integrally attached thereto a collar 12, the collar being externally formed with a cylindrical surface 13 and abutments 14. Also on the driving member 10 is a bearing 16 which supports a fly wheel or inertia member 17, the function of which will be described later. The inertia member 17 is located axially of the shaft by means of the collar 12, a partition 18 and an end plate 19. For assembly purposes the end plate 19 may be in the form of a ring attached by bolts 20 to the end of the fly wheel. Between the partition 18 and the end plate 19 is a cylindrical surface, corresponding to the external surface of the collar 12, on which are internally projecting abutments 21 located between the abutments 14 and separated therefrom by springs 22.

As seen in Fig. 5, this construction permits rotation of the fly wheel 17 with respect to the driving member 10, which rotation is accomplished by a compression of half of the springs. The other half of the springs are not, in practice, compressed, their function being mainly a locating one. A clutch, to be later described, prevents counter-clockwise rotation of the fly-wheel 17 with respect to the shaft 10 beyond the neutral point shown in Fig. 5. If a resilient composition material is to be used between the collar and the inertia member, it may be vulcanized or otherwise rigidly attached to each of the adjacent cylindrical surfaces. It is thus evident that a variation of angular position between the driving member 10 and the inertia member 17 will store energy in the springs and/or resilient material until a sufficient amount is present to cause the inertia wheel to revolve with the speed of the driving shaft.

Between the inertia wheel and the driven member is a friction clutch using a coil spring 25 as one element. This spring is normally expanded into a frictional driving relationship with a drum surface 23 on the driven shaft 11. One end of the spring is rigidly circumferentially attached to the inertia wheel as at 24. Thus upon rotation in the direction shown by the arrow in Fig. 1 the inertia wheel will tend to expand the clutch spring radially and thereby tend to cause a driving engagement between the inertia wheel and the driven shaft.

However, it is sometimes necessary to break this driving engagement. These occasions develop when the driving member 10 has advanced a predetermined amount ahead of the inertia member, that is, when the energy stored in the resilient connection between the driving member and the inertia member has reached a predetermined amount. This energy is a function of the angular displacement and torsional stiffness, hence of the torque being transmitted, and I have, therefore, devised means dependent upon the displacement, and thus upon the torque, for causing the clutch disengagement.

This disengagement is readily accomplishable by connecting the disengaging end of the clutch spring to the driving shaft. This connection which comprises the controlling mechanism for my transmission system comprises a flanged member 26 keyed as at 27 to rotate with the driving shaft and having in the external circumference of the flange, a slot 28 into which is fitted the end of the clutch spring 29.

If we assume that the inertia wheel and the load shaft are engaged in driving relationship and that we then, as we have done in the last paragraph, advance the driving shaft with respect to these two members, then the driving shaft end of the clutch spring 25 will assume the position shown in dotted lines in Fig. 3 in which it is noticed that the end of the spring has been drawn radially inward out of contact with the drum surface of the driven member. This decrease in diameter of the spring is, of course, transmitted along the length of the spring and when the displacement reaches the maximum amount shown, the clutch will be disengaged and the torque ratio will be changed.

When the clutch has been disengaged, the inertia member is thus freed from the driven shaft and the energy stored in the resilient connection between the inertia wheel and the driving member then attempts to reduce the angularity between them. This reduction takes a minute but distinctly measurable period of time and during this interval the inertia member will have transferred to it the energy in the resilient coupling and will thus have imparted to it an angular velocity greater than that of the driving member. The excess velocity times the inertia of the fly wheel will represent the excess kinetic energy transferred to the wheel by the resilient coupling. This same energy is that originally transferred to the resilient coupling by the driving member during the time when displacement was occurring between the driving member 10 and the inertia member 17.

During the time that the inertia member is endeavoring to catch up with the driving shaft it is, of course, understood that the driving shaft is in turn accelerated due to the fact that the load thereon due to the driven member was removed when the clutch was disengaged. The inertia member thus is revolved, during the period when it is attempting to reduce the above mentioned angularity, not only through the arc represented by the angularity present, but also through the arc represented by the revolutions made by the driving member during the same interval of time. The rotation due to this second cause also stores kinetic energy in the fly wheel so that when the inertia wheel has again caught up to the driving member, we find that we have energy stored in the inertia wheel due to two causes, the first of these being that energy stored in the resilient material before clutch disengagement and the second of these being due to the increased velocity of the driving shaft during the period of disengagement.

When the angularity has been reduced to a predetermined minimum, which, as shown in the drawing may be zero, the coil clutch 25 will again expand to the maximum diameter permitted by the drum surface on the driven member and the clutch will then be engaged, and the torque ratio will be increased.

The clutch shown, although a specific construction, is to be considered as being illustrative of only one kind which could be used in this location. The only requirement of the clutch, aside from the fact that it must be engageable by the inertia member, and disengageable by the driving member, is that it shall be quickly engageable without appreciable friction losses. The clutch shown fulfills this requirement and, at the moment of engagement, transfers the energy stored in the inertia wheel to the driven shaft, slowing the inertia wheel down to load shaft speed.

This intermittent transfer of energy to the driven shaft takes place with rapidity but does in fact require a definite time interval, and during this time the driving shaft continues to rotate, and at a speed greater than that of the driven shaft 11, delivering energy to the resilient material which in turn passes this additional energy on to the inertia wheel and the driven shaft. After the transfer of energy from the inertia member to the driven shaft has begun, the driving shaft 10 will continue its advance ahead of the inertia member 17 to the dotted position shown in Fig. 3 and the clutch will again disengage.

Thus I have described the complete cycle of the transmission and the method of controlling the choice of torque ratios. The system absorbs energy from the driving shaft, transmits it to the driven shaft; then, if the load requires a higher torque, the mechanism absorbs more energy, disengages the driving and driven members, absorbs still more energy, engages the driving and driven members, and transmits the total absorbed energy to the driven shaft simultaneously with additional energy flowing from the driving member during the period when the clutch is engaged.

As installed in an automobile, the driving shaft 10 may well be connectible by a clutch 31 to the conventional engine fly wheel 32 which is mounted on the engine crankshaft 33.

The operation of a motor vehicle equipped with this torque amplifying mechanism will be as follows:

Let us first consider what occurs when the vehicle is at rest and the clutch 31 is engaged. This engagement will tend to cause the transmission driving member 10 to rotate in the direction shown by the arrow. At the beginning of this motion the clutch spring 25 is presumed to be engaged with the friction drum surface 23 on the driven shaft 11, and the rotative force of the driving member 10 will endeavor to rotate the inertia member 17 by means of the resilient coupling between the inertia member 17 and the collar 12. If one assumes an extreme condition, such as will be encountered with a heavy loaded vehicle on a steep grade, the engine torque in this direct drive relationship will be insufficient to move the load shaft, or at best will be sufficient only to start the load shaft moving before the engine stalls. Stalling does not, however, take place with the construction shown due to the yielding or deformation of the coil spring adjacent the flange 26, which deformation, as previously explained, accomplishes a disengagement of the clutch.

When this disengagement occurs the driving member 10, the inertia member 17 and the resilient connection between them, will bring about as previously explained a storing of energy in the inertia member and a consequent engagement of the clutch, which engagement results in the application of torque to the driven shaft 11, which torque is greater than that which the engine could supply if directly connected. This additional amount of torque may be varied by the various design factors such as the rate of action of the resilient material, the number of coils of the clutch spring, its diameter, etc., and is designed to be sufficient to move the vehicle under extreme conditions. When the vehicle has begun to move, if the torque developed by the engine is still insufficient for the requirements, the cycle of operation above described will be repeated.

As the vehicle speed increases, the intermittent engagement and disengagement of the driving shaft 10 and driven shaft 11 will cease. This cessation occurs when the torque requirements of the driven shaft have decreased to the torque transmission ability of the resilient connections. The vehicle transmission will then be in what corresponds to direct drive and will continue in this position until the load on the rear wheels increases to such a point that the resilient connection is distorted sufficiently to permit a clutch disengagement. The operation of this unit will then be as previously described for a vehicle at a standstill.

From the foregoing description it will be apparent that this invention provides simple, reliable and efficient means for automatically varying the torque ratio between the driving member and the driven member in accordance with the difference between the torque supplied by the driving member and the torque required to rotate the driven member at driving member speed. If the torque supply is constant the controlling factor then becomes the torque requirement of the driven member.

I have described a specific embodiment of the invention, one which is deemed to be new and advantageous and one which may be specifically claimed, but it is to be understood that the invention is not limited to the exact details of the construction as it will be apparent that changes may be made therein without departing from the spirit or scope of the invention.

Having thus described the invention, what is claimed and desired to be secured by Letters Patent is:

1. In a motor vehicle, torque amplifying mechanism comprising a driving member, inertia means driven thereby, a driven member, a clutch device engageable to drive the driven member, driving connections between the inertia means and the clutch, and a continuous connection around said inertia means between the driving member and the clutch.

2. In a motor vehicle, torque amplifying mechanism comprising a driving member, inertia means driven thereby, a driven member, a clutch device engageable to drive the driven member, driving connections between the inertia means and the clutch, and clutch controlling connections around said inertia means between the driving member and the clutch.

3. In a motor vehicle, a driving member, a driven member, a connection between them, inertia means connected to said connection, and a resilient connection between said inertia means and said driving member whereby energy may be automatically transferred at an increased torque from said driving to said driven member through said inertia means.

4. In a motor vehicle, torque amplifying mechanism comprising a driving member, a driven member, a clutch engageable with said driven member, and resiliently mounted inertia means for accomplishing said engagement.

5. In a power transmission mechanism capable of automatically varying the torque transmitted and comprising a driving member, a driven member, and a connection between them including a clutch; inertia means directly connected to said clutch, and resilient connecting means between said driving member and said inertia means.

6. In a power transmisison system capable of transmitting power at multiple torque ratios the combination with a driving member, a driven member, and a connection between them including a torque amplifying device, of a connection between said members around said device, said connection being actuated by the torque requirements of the driven member automatically to select the torque ratio required.

7. In a power transmission system, mechanism capable of automatically varying the torque transmitted, comprising a driving member, a driven member, inertia means, and a connection between said inertia means and each of said members whereby oscillation in one direction of the inertia means with respect to the driving means always transfers inertia from said driving member to said inertia means and oscillations in the other direction always transfer energy from said inertia means to said driven member.

8. In a power transmission system having a driving member, an inertia means, and a driven member, the method of varying the torque transmitted between said members which comprises rotating the driving member ahead of the inertia means and thereby disconnecting the driven member from the rest of the transmission system, continuing to rotate the driving member, storing energy in said inertia means while the driving member is rotating at a speed greater than that of the inertia means until the inertia means is forced to rotate at a speed greater than that of the driving member, continuing to supply energy to said inertia means until the inertia means has resumed its initial position relative to the driving member, and then transferring energy from said driving member and stored energy from said inertia means to said driven member until the speed of rotation of the inertia means about the driving member axis falls below that of the driving member.

9. In a motor vehicle transmission, a driving member, a driven member, a friction connection between said members, an inertia means, a resilient connection between said inertia means and said driving member, and a driving connection between the inertia means and said driven member.

10. In a power transmission system, the combination of a driving member, a driven member, and connecting means between said driving and driven members comprising a clutch element, an inertia means, and a positive connection between said inertia means and said element.

11. In a power transmission system, the combination of a driving member, a driven member, inertia means, a resilient connection between the driving member and the inertia means, and resilient clutch means between the inertia means and the driving member engageable with said driven member.

12. In a power transmission system, the combination of a driving member, a driven member, inertia means resiliently connected to said driving member, and a coil spring connected at one end to the driving member and at the other end to the inertia means, said spring when expanded frictionally clutching said driven member.

13. In a power transmission system, the combination of a driving shaft, a driven shaft having an enlarged hollow end telescoping one end of the driving shaft, an inertia member telescoping the driving shaft and resiliently connected thereto, and a coil spring extending around the driving shaft, said spring being secured at one end to the driving shaft and at the other end to the inertia member, said spring lying partially within the hollow end of the driving shaft and frictionally clutching the same when in its larger diameter relation.

MILLER R. HUTCHISON, Jr.